(12) United States Patent
Yamashita

(10) Patent No.: US 8,775,768 B2
(45) Date of Patent: Jul. 8, 2014

(54) INFORMATION PROCESSING APPARATUS AND METHOD OF CONTROLLING THE SAME

(75) Inventor: Takahiro Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 13/358,275

(22) Filed: Jan. 25, 2012

(65) Prior Publication Data

US 2012/0215993 A1 Aug. 23, 2012

(30) Foreign Application Priority Data

Feb. 17, 2011 (JP) ................................ 2011-032630

(51) Int. Cl.
*G06F 12/00* (2006.01)
*G06F 12/06* (2006.01)
*G06F 3/06* (2006.01)
*G06F 1/32* (2006.01)

(52) U.S. Cl.
CPC .......... *G06F 12/0653* (2013.01); *G06F 3/0685* (2013.01); *G06F 1/3287* (2013.01)
USPC ............ 711/171; 711/135; 707/812; 713/324

(58) Field of Classification Search
CPC ....... G06F 12/00; G06F 12/0223; G06F 7/78; G06F 5/06; G06F 13/4059
See application file for complete search history.

(56) References Cited

U.S. PATENT DOCUMENTS

| | | | |
|---|---|---|---|
| 6,366,981 B1 * | 4/2002 | Koike | 711/114 |
| 6,523,125 B1 * | 2/2003 | Kohno et al. | 713/320 |
| 6,611,919 B1 * | 8/2003 | Matsuya et al. | 713/320 |
| 2007/0183179 A1 * | 8/2007 | Maeda et al. | 365/52 |
| 2008/0065845 A1 * | 3/2008 | Montero et al. | 711/162 |
| 2009/0157960 A1 | 6/2009 | Koga | |
| 2009/0207423 A1 * | 8/2009 | Shimizu et al. | 358/1.1 |
| 2010/0174934 A1 * | 7/2010 | Zhao et al. | 713/324 |
| 2010/0268967 A1 * | 10/2010 | Senda | 713/193 |
| 2010/0287344 A1 * | 11/2010 | Abzarian et al. | 711/162 |
| 2011/0252201 A1 * | 10/2011 | Koren et al. | 711/135 |

FOREIGN PATENT DOCUMENTS

| | | |
|---|---|---|
| CN | 1783025 | 6/2006 |
| CN | 1993682 | 7/2007 |
| JP | 2009146061 A | 7/2009 |

OTHER PUBLICATIONS

Chinese Office Action dated Apr. 24, 2014 issued during prosecution of related Chinese application No. 201210035149.4. (Whole English-language translation included.).

* cited by examiner

*Primary Examiner* — Kalpit Parikh
*Assistant Examiner* — Alvaro R Calderon, IV
(74) *Attorney, Agent, or Firm* — Fitzpatrick, Cella, Harper & Scinto

(57) ABSTRACT

A first nonvolatile storage device has a higher access speed in a continuous access than a random access and a second nonvolatile storage device has a higher access speed in the random access than the continuous access. The information processing apparatus selects a first storage method in which an amount of continuous data is larger than an amount of random data if data stored in a volatile storage device is saved in the first nonvolatile storage device, and selects a second storage method in which an amount of random data is larger than an amount of continuous data if the data stored in the volatile storage device is saved in the second nonvolatile storage device, and saves the data stored in the volatile storage device into the specified nonvolatile storage device using the selected storage method when a predetermined condition is satisfied.

5 Claims, 9 Drawing Sheets

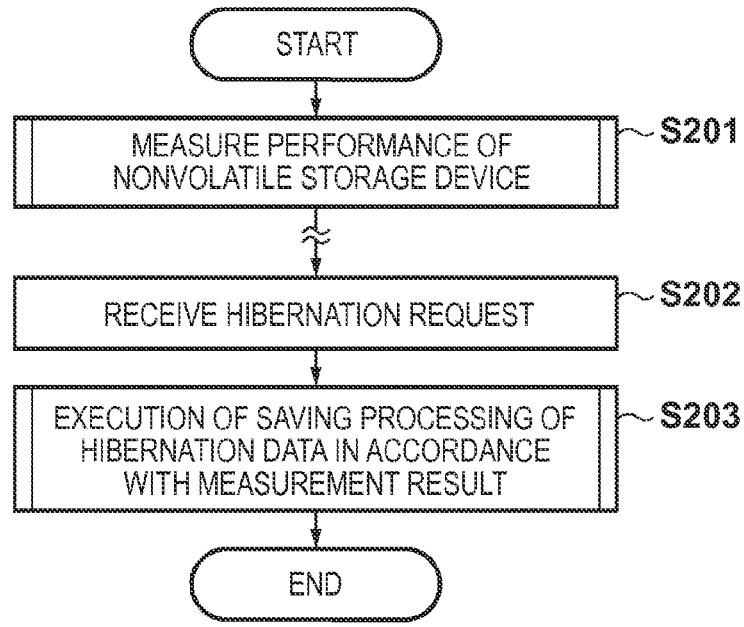
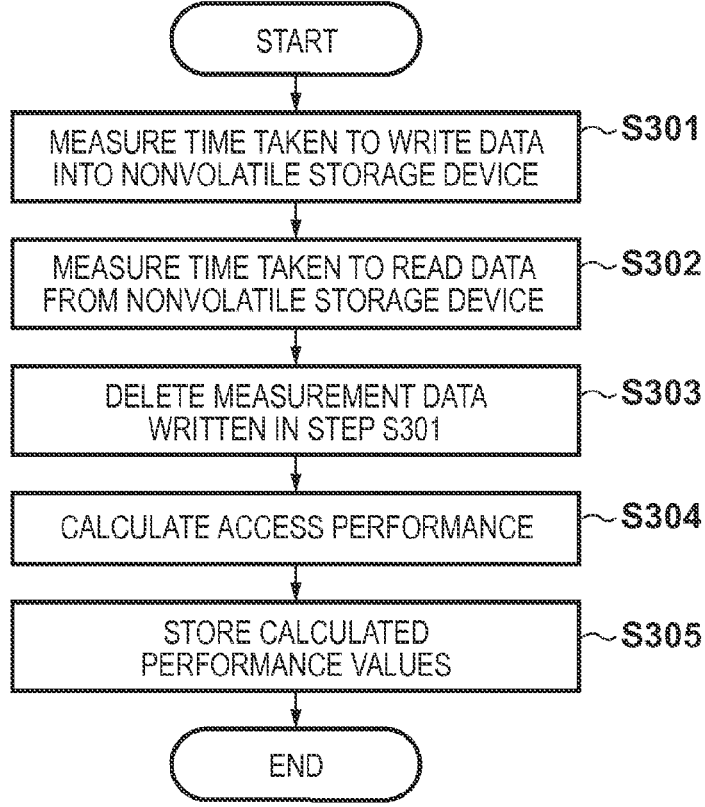

FIG. 4

| MEMORY AREA IDENTIFICATION DATA | START ADDRESS OF MEMORY AREA | SIZE OF MEMORY AREA | RESTORE PROCESSING | SAVE DESTINATION ADDRESS |
|---|---|---|---|---|
| 1 | 0x01000000 | 32MB | SUCCESSIVE | 0xE1000000 |
| 2 | 0x02000000 | 8MB | SUCCESSIVE | 0xE2000000 |
| 3 | 0x02800000 | 4KB | RANDOM | 0xE2800000 |

401, 402, 403, 404, 405

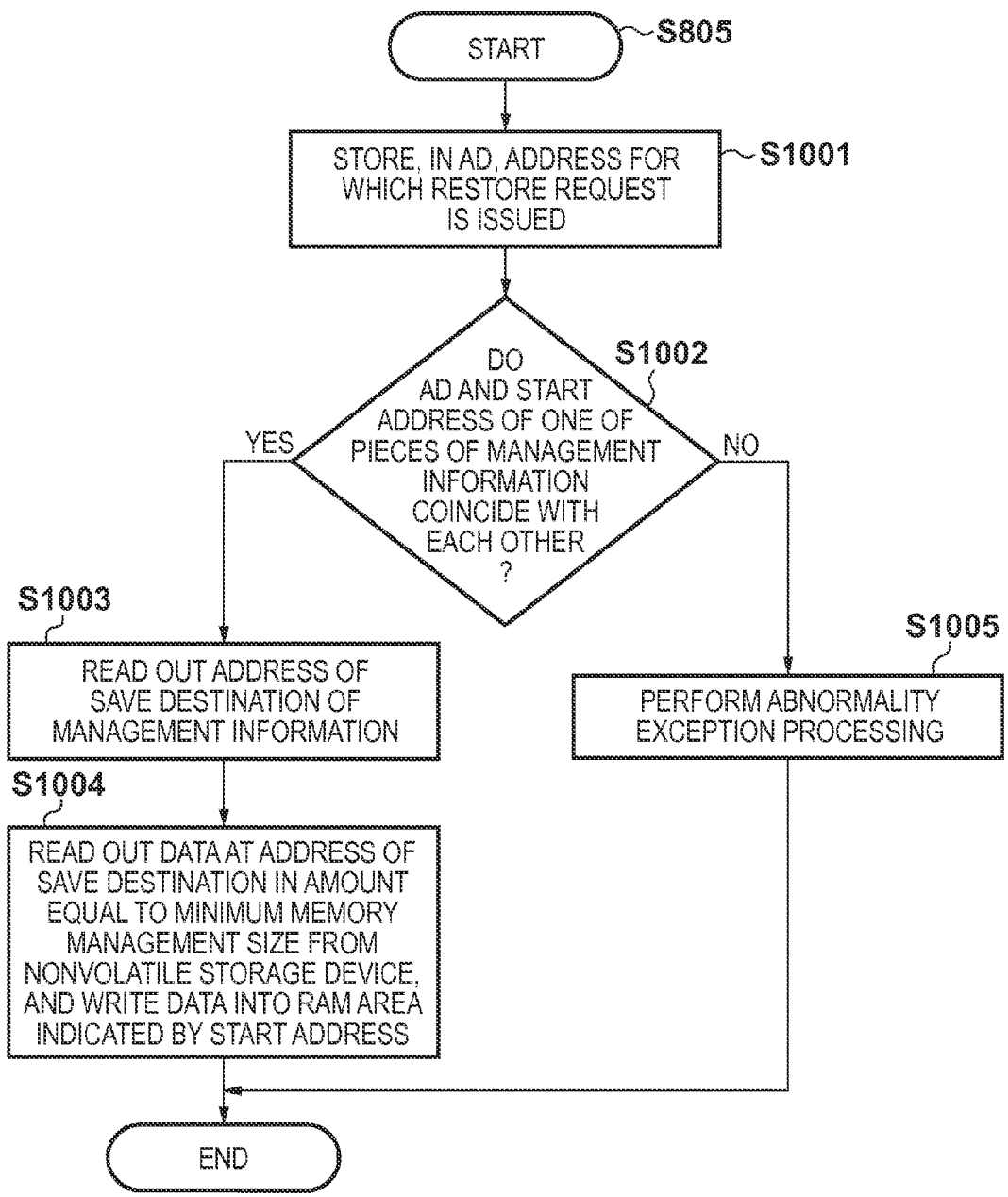

INFORMATION PROCESSING APPARATUS AND METHOD OF CONTROLLING THE SAME

BACKGROUND OF THE INVENTION

1. Field of the Invention

The present invention relates to an information processing apparatus having a hibernation function, and a method of controlling the same.

2. Description of the Related Art

With an increase in scale of software which forms a system, the time (start-up time) from when a power supply switch is turned on until system start-up is completed is prolonged. As one of solutions to a problem resulting from this prolongation of the start-up time, a hibernation technique is available.

In hibernation, information stored in a volatile memory (RAM) of a system is saved in a nonvolatile storage device such as a hard disk drive (HDD), an SSD (Solid State Drive), or a USB (Universal Serial Bus) memory before the power supply is shut down. Upon the next system start-up, the saved information is rewritten into the volatile memory to restore the system state before shutdown. In recent operating system (OS), hibernation is implemented by software to, for example, omit saving and restore processing of unnecessary information upon start-up, thereby shortening the restore time. In this hibernation, information is exchanged between a volatile memory and a nonvolatile storage device, so the access-speed of a device (generally, the nonvolatile storage device) having a low access speed considerably influences the hibernation processing time.

When the time required for normal system start-up processing, and the system restore time upon hibernation are compared with each other, and if the latter time is shorter, it is advantageous to use hibernation upon system start-up. In Japanese Patent Laid-Open No. 2009-146061, a determination as to whether the use of hibernation is advantageous is done by measuring the performance of a nonvolatile storage device serving as a save destination for information, and predicting the restore time upon hibernation, in accordance with the measured information. Based on this predicted restore time, it is decided whether the next system start-up operation is to be performed by hibernation.

However, conventionally, hibernation processing is performed in accordance with a predetermined procedure, independently of the performance of a nonvolatile storage device serving as a save destination for hibernation data. This poses a problem that processing specialized for the nonvolatile storage device is not performed. For example, an HDD accesses information stored in a magnetic disk as the internal head mechanically operates. Therefore, the HDD has a structural feature that the number of mechanical operations increases as pieces of information to be accessed are fragmented more on the magnetic disk, and the access speed to the information lowers. On the other hand, an SSD accesses stored information by electrical processing, and therefore can access the information at a constant access speed independently of the degree of fragmentation of pieces of information.

When, for example, an HDD is used as a save destination for hibernation data in consideration of the above-mentioned feature of a nonvolatile storage device, it is desirable to suppress fragmentation of hibernation data so as not to lower the access speed. In the case of, for example, Linux, the mechanism of a swap file, in which part of hibernation data is saved in an unused memory area, and restored in the memory where necessary, is employed. Because swap file restore processing is performed for each minimum size in terms of memory management, random access occurs a number of times equal to a value obtained by dividing the area to be restored by the minimum size. Therefore, when an HDD is used, it is desirable not to perform restore processing using a swap file as much as possible.

SUMMARY OF THE INVENTION

An aspect of the present invention is to eliminate the above-mentioned problems in the conventional technology.

A feature of the present invention lies in that hibernation processing corresponding to the characteristics of a nonvolatile memory which saves data for use in hibernation is performed.

According to an aspect of the present invention, there is provided an information processing apparatus being able to access to a volatile storage device, a first nonvolatile storage device having a higher access speed in a continuous access than a random access and a second nonvolatile storage device having a higher access speed in the random access than the continuous access, the apparatus comprising: a specifying unit configured to specify a nonvolatile storage device in which data stored in the volatile storage device is to be saved; a selection unit configured to select a first storage method in which an amount of continuous data is larger than an amount of random data in a case that the specifying unit specifies the first nonvolatile storage device, and select a second storage method in which an amount of random data is larger than an amount of continuous data in a case that the specifying unit specifies the second nonvolatile storage device; and a control unit configured to save the data stored in the volatile storage device in the nonvolatile storage device specified by the specifying unit using the first or second storage method selected by the selection unit in a case that a predetermined condition is satisfied, and stop supplying electric power to the volatile storage device.

According to an aspect of the present invention, there is provided a method of controlling an information processing apparatus being able to access a volatile storage device, a first nonvolatile storage device having a higher access speed in a continuous access than a random access and a second nonvolatile storage device having a higher access speed in the random access than the continuous access, the method comprising: specifying a nonvolatile storage device in which data stored in the volatile storage device is to be saved; selecting a first storage method in which an amount of continuous data is larger than an amount of random data in a case that the specifying step specifies the first nonvolatile storage device, and selecting a second storage method in which an amount of random data is larger than an amount of continuous data in a case that the specifying step specifies the second nonvolatile storage device; and controlling to save the data stored in the volatile storage device in the nonvolatile storage device specified in the specifying step using the first or second storage method selected in the selecting step in a case that a predetermined condition is satisfied, and stopping supplying electric power to the volatile storage device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart for describing a basic operation according to the embodiment;

FIG. 3 is a flowchart for describing processing of measuring the read/write performance of a nonvolatile storage device in step S201 of FIG. 2;

FIG. 4 depicts a view illustrating an example of a table for explaining the data structure of management information;

FIG. 10 is a flowchart for describing restore processing of random read data in step S805 of FIG. 8.

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
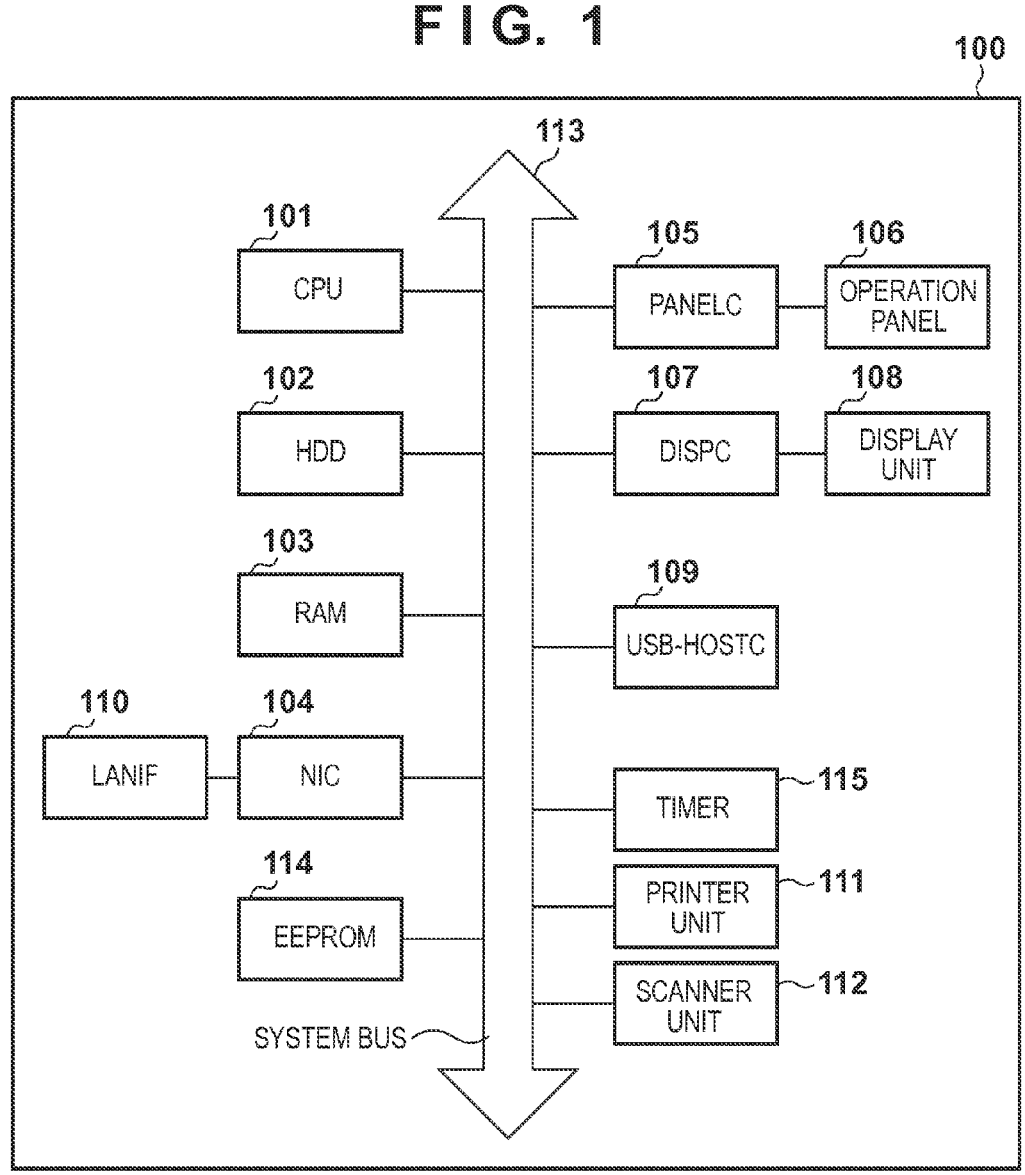
FIG. 1 is a block diagram showing the configuration of an image forming apparatus (multi-function peripheral) according to an embodiment.

FIG. 1 is a block diagram showing the configuration of an image forming apparatus (multi-function peripheral) which exemplifies an information processing having a hibernation function according to an embodiment of the present invention. Note that a multi-function apparatus (multi-function peripheral) having, for example, a printer function, a scanner function, a facsimile function, and a storage function will be described in this embodiment. However, the information processing apparatus according to the present invention is not limited to this, and is also applicable to, for example, an information processing apparatus such as a PC, a game device, and various mobile devices. Although an embodiment in which an HDD is used as a nonvolatile storage device (nonvolatile memory) will be described hereinafter, other nonvolatile storage devices such as an SSD and a USB memory may also be used.

Referring to FIG. 1, an image forming apparatus 100 includes a CPU 101 which executes processing after a program installed on an HDD 102 is loaded into a RAM 103. The CPU 101 systematically controls each device connected to a system bus 113, in accordance with the program loaded into the RAM 103. The RAM (volatile memory) 103 functions as, for example, the main memory and work area of the CPU 101. A panel controller (PANELC) 105 controls input of an instruction via, for example, a touch panel or various buttons provided to an operation panel 106. A display controller (DISPC) 107 controls display on a display unit 108 that uses, for example, a liquid crystal display. Note that the display unit 108 is provided on the operation panel 106. A network interface card (NIC) 104 connects a LAN cable to a LAN interface (LANIF) 110 to bi-directionally exchange data with, for example, other network devices or a file server. A USB-HOSTC 109 is a USB connector which connects a USB memory (not shown) or a USB compatible device. A printer unit 111 includes a printer engine of, for example, the electrophotographic or inkjet type, and records (prints) an image on a recording medium such as paper. A scanner unit 112 reads a document image to generate an image signal representing this image. In many cases, the scanner unit 112 mounts an auto document feeder (not shown) as an option, and can convey a plurality of documents and automatically read them. An EEPROM (Electrically Erasable Programmable Read-Only Memory) 114 is a rewritable low-capacity nonvolatile memory, and stores, for example, setting information of the image forming apparatus 100. A timer 115 performs time measurement such as measurement of the elapsed time in accordance with an instruction from the CPU 101.

Completion of system start-up is defined as the time point at which input of an instruction from the touch panel or the various buttons of the operation panel 106 becomes possible after the image forming apparatus 100 is powered on. The start-up completion may also be defined as the time point at which the display unit 108 is turned on, or that at which a predetermined image is displayed on the display unit 108 after it is turned on. Alternatively, the start-up completion may be defined as the time point at which the blinking state or lighting color of an LED light of the display unit 108 is changed.

FIG. 2 is a flowchart for briefly describing a basic operation in which hibernation processing is changed in accordance with the performance of the nonvolatile storage device (a save destination for hibernation data) as a feature according to this embodiment. Although the processing details of each processing unit will be described later with reference to the accompanying drawings, a schematic basic operation as a feature of this embodiment will be described first with reference to this flowchart. A case in which hibernation processing is performed based on the successive reading speed and random reading speed of the nonvolatile storage device will be described in this embodiment. Note that this processing is implemented by loading, into the RAM 103, a program which is installed on the HDD 102 and used to execute this processing, and executing this program by the CPU 101.

In the case of, for example, Linux, memory restore processing in hibernation is performed by first processing of roughly restoring the overall memory, and second processing of restoring the remaining unrestored areas when this area is used. In the first processing, the system does not execute other operations, and restores data in successive large areas. Therefore, the first processing depends on the successive reading speed. The other, second processing is processing of restoring an area serving as a request destination in an amount equal to the minimum memory size in response to a restore request, and therefore depends on the random reading speed. When restore processing is performed using only processing, compatible with the nonvolatile storage device, of these two types of processing, the restore processing is expected to be completed in a time shorter than that required to perform restoration using both these types of processing.

The second processing is exception processing when a program accesses an unrestored area, so this program can run only after restoration is completed. Hence, in the second processing, restore processing is performed in a shortest time for each minimum memory size. Also, in the second processing, it is hard to predict the restoration area, so this processing can be performed only by random reading (random access) processing. The second processing is important in terms of performing restore processing so that the system is apparently unstopped, and is implemented in other operating systems as well (demand paging processing).

First, in step S201, the performance of the HDD 102 is measured at an arbitrary time point after the image forming apparatus 100 is started up. Examples of the timing of this processing include the time point at which a swap of the HDD 102 is detected, that at which the image forming apparatus 100 receives a hibernation processing request, and that at which the image forming apparatus 100 assumes an idle state. When a hibernation processing request is received in step S202, restore processing of hibernation data is performed in step S203, based on the performance measurement result obtained in step S201.

FIG. 3 is a flowchart for describing processing of measuring the read/write performance of the nonvolatile storage device in step S201 of FIG. 2. By executing the processing shown in this flowchart, the image forming apparatus 100 obtains the measurement values of the successive read/write performance and random read/write performance of the nonvolatile storage device, and performs hibernation processing based on these measurement values.

First, in step S301, predetermined data is written into the HDD 102, and the time required for write the predetermined data is measured using the timer 115. In this case, the predetermined data is data with a data size and data format that allow measurement of the successive read/write performance and random read/write performance. The process advances to step S302, in which the predetermined data written in step S301 is read from the HDD 102, and the time required for the reading processing of the predetermined data is measured using the timer 115. Again, in this case, the predetermined data is data with a data size and data format that allow measurement of the successive read/write performance and random read/write performance.

The process advances to step S303, in which the data written in step S301 is deleted because it is unnecessary. The process advances to step S304, in which the access performance of the nonvolatile storage device is calculated from the size of the data written and read in steps S301 and S302, respectively, and the times required for write and read. As a method of calculating the access performance, a rough performance value can be obtained by dividing the size of the read/written data by the average of the times required for read and write. The process advances to step S305, in which the performance value calculated in step S304 is stored in the HDD 102.

Note that the flowchart shown in FIG. 3 exemplifies a method of measuring the read/write performance of the nonvolatile storage device, and the access performance of the nonvolatile storage device may be measured using other methods.

FIG. 4 depicts a view illustrating an example of a table for explaining the data structure of hibernation management information (to be simply referred to as management information hereinafter) according to this embodiment. These data are used in saving processing and restore processing of hibernation data.

This management information includes memory area identification data 401, a start address of memory area 402, a size of memory area 403, restore processing 404 in hibernation, and a save destination address (the address of hibernation data in the nonvolatile storage device) 405.

The start address of memory area 402 indicates the start address of saved data of the RAM 103, and the size of memory area 403 indicates the length of this data (the variable length of this data). Therefore, management information in which the memory area identification data 401 is, for example, "1", data of 32 MB (megabytes) from address "0x01000000" of the RAM 103 is successively stored from address "0xE1000000" of the nonvolatile storage device. Also, when the restore processing 404 is "random", as in a case in which the memory area identification data 401 is "3", read/write is done for each unit (predetermined length) of data of 4 KB (kilobytes) corresponding to the minimum memory management size. Note that this management information is stored in the HDD 102.

Figure 5:
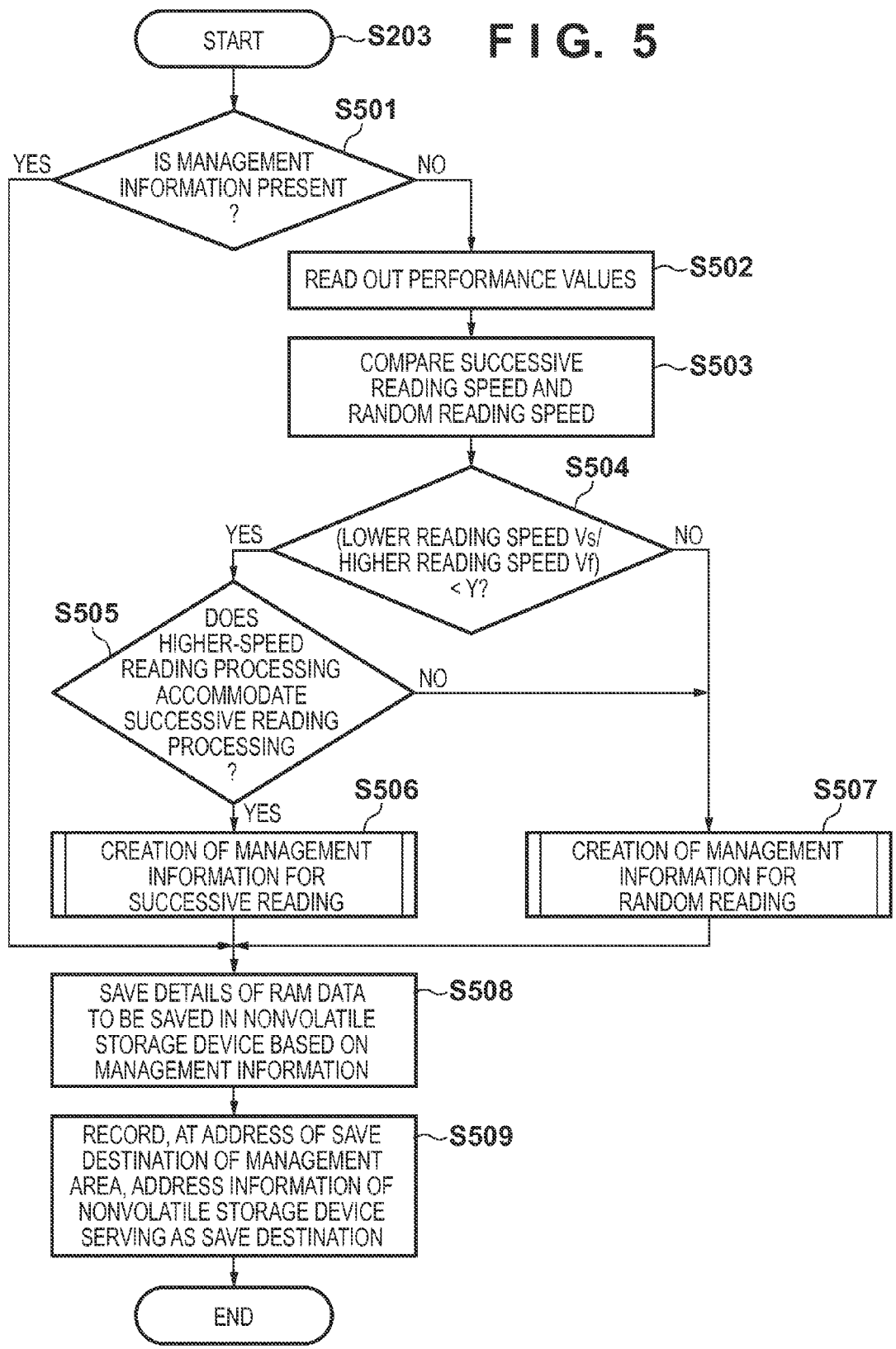
FIG. 5 is a flowchart for describing restore processing of hibernation data by the image forming apparatus according to the embodiment.

FIG. 5 is a flowchart for describing saving processing of hibernation data by the image forming apparatus according to this embodiment. Note that this processing corresponds to the process in step S203 of FIG. 2. Creation processing of management information in steps S506 and S507 of this flowchart will be described in detail later. In accordance with this flowchart, data which is to be saved and present in the RAM 103 is converted into a read format compatible with the nonvolatile storage device serving as a save destination, and is saved.

First, in step S501, the presence/absence of management information is confirmed. This management information will be described in detail later. If it is determined that management information is absent, the process advances to step S502, in which the performance value stored in the HDD 102 in step S305 of FIG. 3 is read out. In the following description, each of the successive reading speed and the random reading speed is used as this performance value. In step S503, the successive reading speed and random reading speed, that is, the performance values read out in step S502 are compared with each other. In this case, the higher speed is defined as a higher reading speed Vf, and the lower speed is defined as a lower reading speed Vs. The process advances to step S504, in which the ratio Vs/Vf between these two speeds Vf and Vs is calculated. This speed ratio and a predetermined threshold Y are compared with each other. Although the threshold Y is set to "0.67" as a reference value in this case, an arbitrary numerical value may be set as long as it falls within the range from "0" (exclusive) to "1" (inclusive). If it is determined in step S504 that the speed ratio is lower than the threshold Y, the difference between the two reading speeds is considerable, and the process advances to step S505. It is determined in step S505 whether higher-speed reading processing accommodates successive reading processing. If YES is determined in step S505, the process advances to step S506, in which management information for successive reading processing is created.

On the other hand, if it is determined in step S505 that higher-speed reading processing accommodates random reading processing (NO in step S505), the process advances to step S507, in which management information for random reading processing is created. If it is determined in step S504 that the speed ratio is equal to or higher than the threshold Y, the process advances to step S507 as well, in which management information is created so that hibernation processing is performed using only random reading processing.

Thus, after step S506 or S507 is executed, or if it is determined in step S501 that management information is present, the process advances to step S508, in which data which is to be saved and present in the RAM 103 is stored in a predetermined area of the HDD 102 based on the management information. In this case, data in a memory area to undergo successive reading processing is stored in a predetermined DMA transfer area of the HDD 102 for each size that allows DMA transfer in ascending order of memory area identification data 401. On the other hand, data in a memory area to undergo random reading processing is added with the address information of the RAM 103 for each minimum memory management unit size, and stored in a predetermined demand paging area of the HDD 102. The process advances to step S509, in which the address information in the HDD 102 serving as a save destination for a memory area is stored in a hibernation memory management area as the save destination address 405.

In this manner, in the processing shown in FIG. 5, if the difference between the successive reading speed and the random reading speed is only a little, data in the RAM 103 is saved in a nonvolatile memory such as the HDD by random reading processing. This is because while the operability degrades in successive reading processing due to prolongation of the standby time required for data transfer in this processing, degradation in operability can be suppressed in random reading processing as it can be executed in the background.

Figure 6:
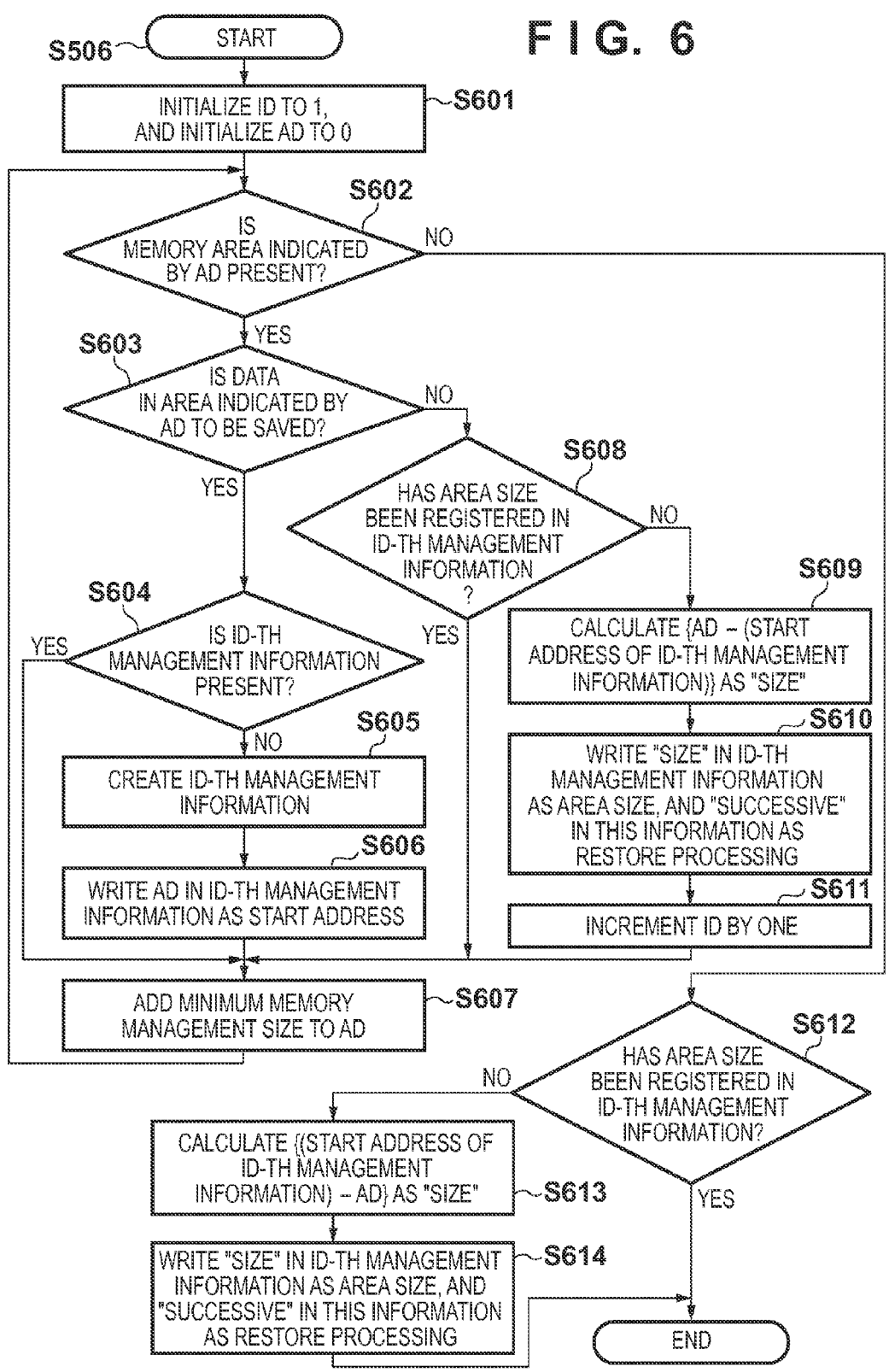
FIG. 6 is a flowchart for describing creation processing of management information for successive reading in step S506 of FIG. 5.

FIG. 6 is a flowchart for describing creation processing of management information for successive reading in step S506 of FIG. 5. Although the minimum memory management size is set to 4 KB (kilobytes) in this embodiment, the present invention is not limited to this, and the minimum management size of a memory management system may be used.

First, in step S601, a variable ID for use in the processing shown in FIG. 6 is initialized to "1", and a variable AD indicating an address is initialized to "0". Note that the variable ID and variable AD are stored in the work area of the RAM 103. In this case, the value of the variable ID corresponds to the memory area identification data 401 (FIG. 4), and the value of the variable AD corresponds to the start address of memory area 402 (FIG. 4). These values are used to create management information. The process advances to step S602, in which it is determined whether a memory area (RAM area) at an address indicated by the variable AD is present.

Processing of deciding the start address of memory area 402 of the data which is to be saved and present in the RAM 103 will be described first. If it is determined in step S602 that an area indicated by the variable AD (address) is present in the RAM 103, the process advances to step S603, in which it is determined whether the address indicated by the variable AD corresponds to an area having data to be saved. If YES is determined in step S603, the process advances to step S604, in which it is determined whether ID-th management information indicated by the variable ID is present. If YES is determined in step S604, the process directly advances to step S607; otherwise, the process advances to step S605, in which management information is newly created upon defining the value of the memory area identification data 401 as the value of the variable ID. The process advances to step S606, in which the current value of the variable AD is written as the start address of memory area 402 of the ID-th management information, and the process advances to step S607. At this time, the memory area identification data 401 and start address of memory area 402 are written in the ID-th management information, and other values are empty.

Processing of deciding the size of memory area 403 will be described next. In step S607, an address corresponding to the minimum memory management size (4 KB in this case) is added to the start address of memory area 402, and the process returns to step S602. If it is determined in step S603 that the address indicated by the variable AD does not correspond to an area having data to be saved, the process advances to step S608, in which it is determined whether the value of the size of memory area 403 is registered in the ID-th management information. If YES is determined in step S608, the process directly advances to step S607. On the other hand, if NO is determined in step S608, the process advances to step S609, in which the difference (SIZE) between the address AD to which reading has currently progressed, and the start address of the ID-th data stored in step S606 is calculated. In step S610, this SIZE value is written as the size of memory area 403 of the ID-th management information. Also, "successive" is written as the restore processing 404. The process advances to step S611, in which the value of the variable ID is incremented by one to make preparations to create the next management information, and the process advances to step S607.

In this way, reading from the memory (RAM 103) progresses. If the area indicated by the variable AD reaches an unmanaged memory area in the RAM 103 in step S602, the process advances to step S612. In step S612, it is determined whether the size of memory area 403 is registered in the ID-th management information serving as the last memory area identification data 401. If YES is determined in step S612, the process ends; otherwise, the process advances to step S613, in which the SIZE value of the area size is calculated in the same way as in step S609. The process advances to step S614, in which the SIZE value is written as the size of memory area 403 of the ID-th management information, and "successive" is written as the restore processing 404, as in step S610, and the process ends.

Thus, successive data which are to be saved and present in the RAM 103 can be continuously stored in the variable-length area of the HDD 102, which is indicated by the address of the save destination.

Figure 7:
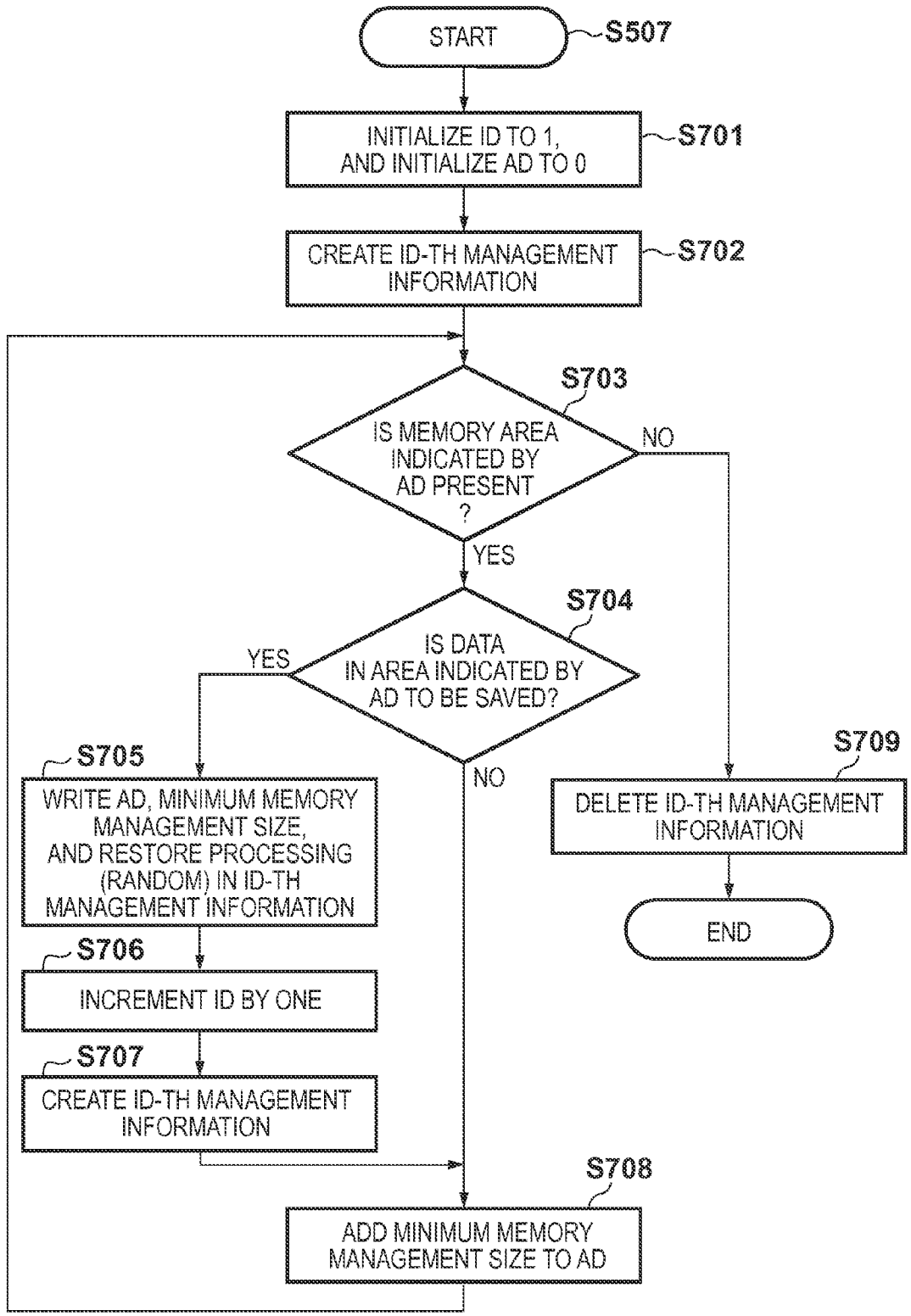
FIG. 7 is a flowchart for describing creation processing of management information for random reading in step S507 of FIG. 5.

FIG. 7 is a flowchart for describing creation processing of management information for random reading in step S507 of FIG. 5. Although the minimum memory management size is set to 4 KB (kilobytes) in this embodiment, the present invention is not limited to this, and the minimum management size of a memory management system may be used.

First, in step S701, the variable ID is initialized to "1", and the variable AD is initialized to "0". Note that the variable ID and variable AD are stored in the work area of the RAM 103. In this case, the value of the variable ID corresponds to the memory area identification data 401, and the value of the variable AD corresponds to the start address of memory area 402. These values are used to create management information. The process advances to step S702, in which ID-th management information is created. At this time, only the memory area identification data 401 is written in this management information, and other values are empty. The process advances to step S703, in which it is determined whether a memory area (RAM 103) at an address indicated by the variable AD is present. If YES is determined in step S703, the process advances to step S704, in which it is further determined whether data in this area is to be saved. If YES is determined in step S704, the process advances to step S705, in which the value of the variable AD is written as the start address of memory area 402 of the ID-th management information, the minimum memory management size is written as the size of memory area 403, and "random" is written as the restore processing 404. In step S706, the value of the variable ID is incremented by one. In step S707, ID-th management information defined as the value of the variable ID is newly created. At this time, only the memory area identification data 401 is written in this management information, and other values are empty. The process advances to step S708, in which the value of the variable AD is increased in an amount equal to the minimum memory management size, and the process returns to step S703, in which the next memory area is read. If it is determined in step S703 that no memory area indicated by the variable AD remains in the RAM 103, the process advances to step S709, in which the lastly created, unnecessary ID-th management information is deleted, and the process ends.

In this way, data which is to be saved and present in the RAM 103 can be stored in the area (predetermined size) of the HDD 102 indicated by the address of the save destination for each minimum memory management size (4 KB).

The sequence of restore processing of hibernation data will be described next with reference to a flowchart shown in FIG. 8.

Figure 8:
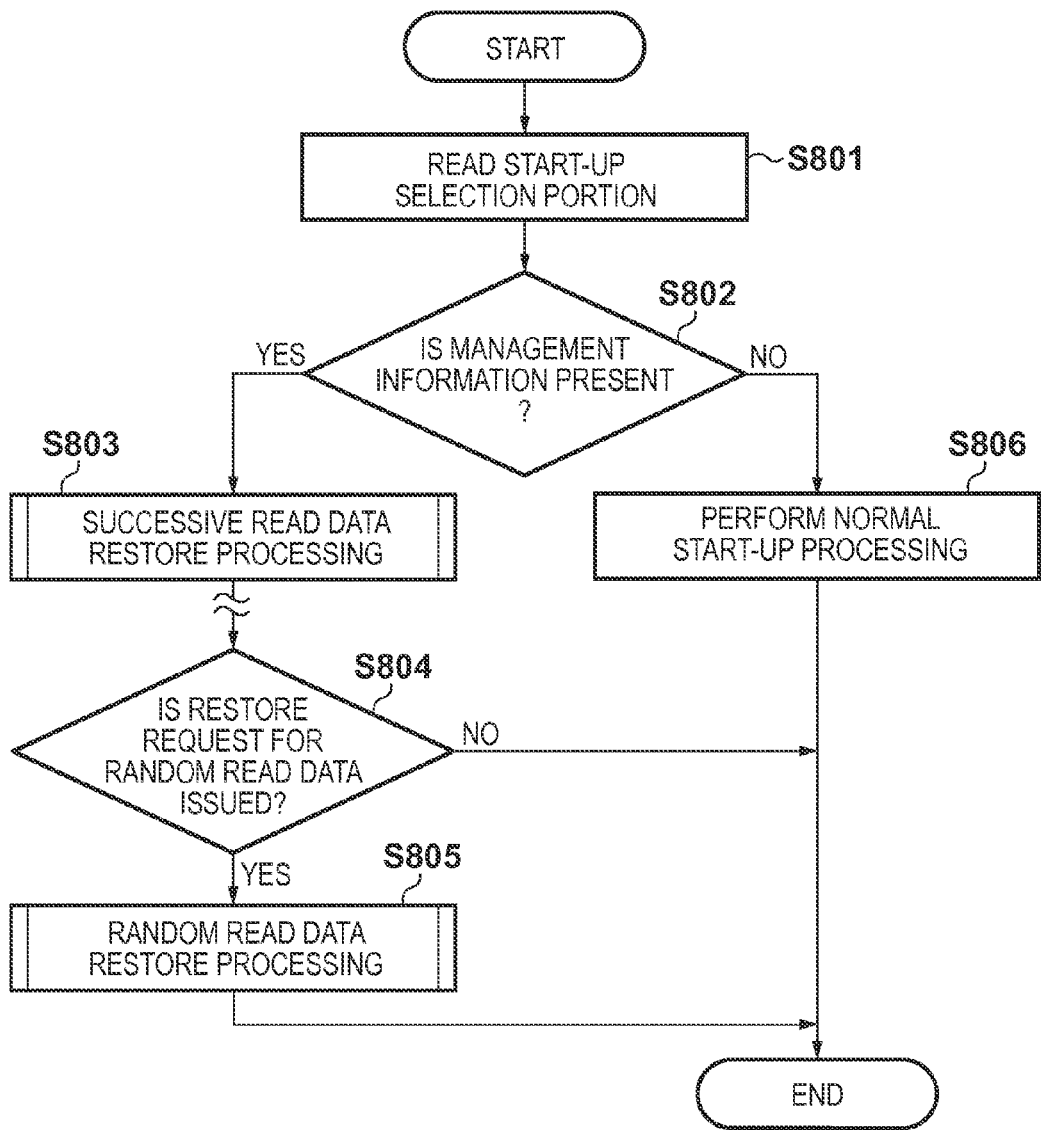
FIG. 8 is a flowchart for describing restore processing of hibernation data according to the embodiment.

FIG. 8 is a flowchart for briefly describing restore processing of hibernation data according to this embodiment. Note that this processing is implemented by loading, into the RAM 103, a program which is installed on the HDD 102 and used to execute this processing, and executing this program by the CPU 101.

First, in step S801, after power-on, a startup selection program stored in the HDD 102 is expanded in the RAM 103. In step S802, the start-up selection program is used to determine the presence/absence of management information. If NO is determined in step S802, the process advances to step S806, in which normal start-up processing is performed without hibernation. The normal start-up processing means herein, for example, reading and initialization processing of an operating system stored in the HDD 102, reading and initialization processing of a device driver, and reading and initialization processing of other types of software.

On the other hand, if YES is determined in step S802, the process advances to step S803, in which restore processing of successively reading saved data is performed. After the restore processing of successively reading this data is completed, when a data restore request for reading saved data from a random address is issued in step S804, the process advances to step S805, in which restore processing of the saved data is performed for each minimum memory management size. This data restore request is sequentially issued as the CPU 101 accesses an unrestored memory area.

Figure 9:
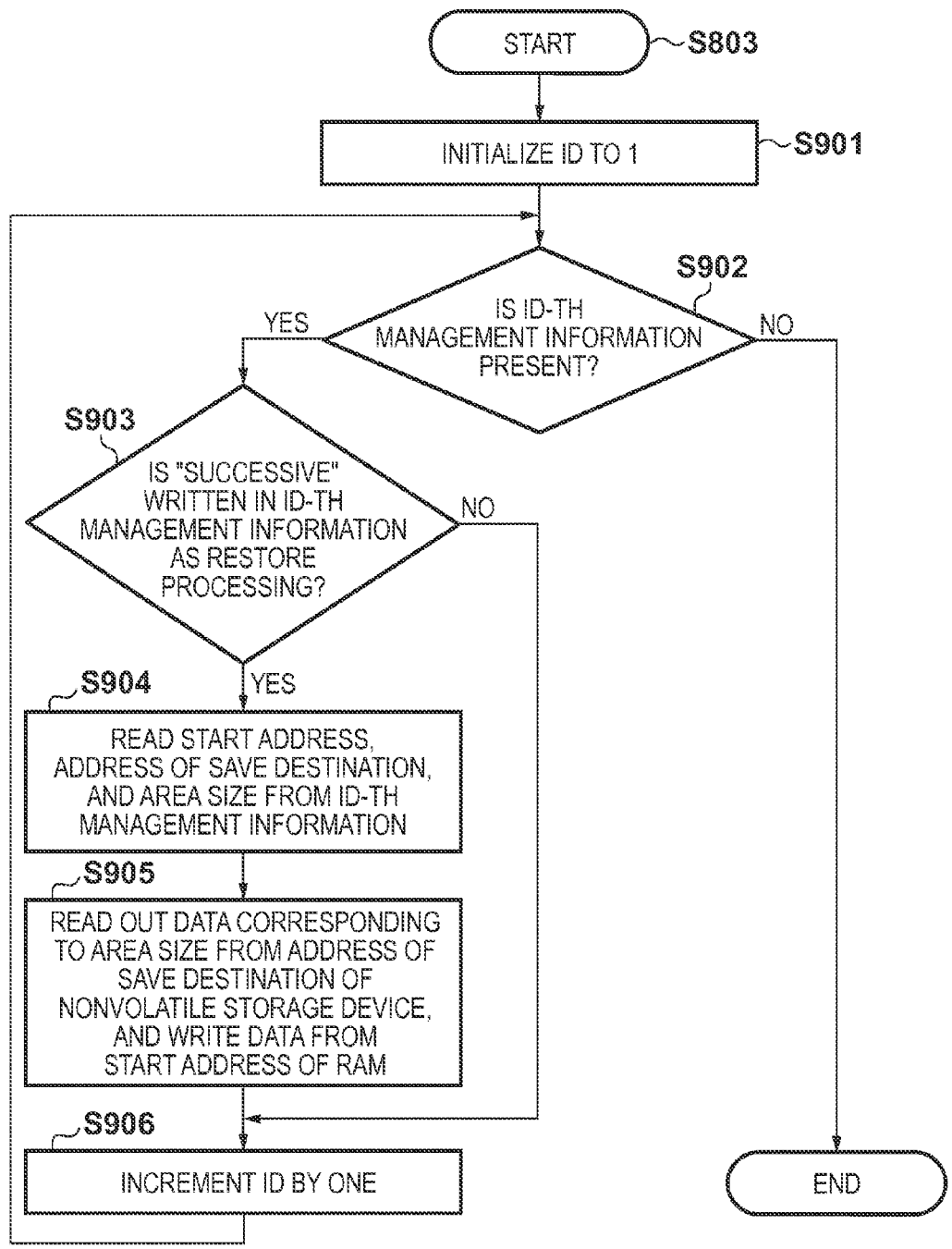
FIG. 9 is a flowchart for describing restore processing of successive read data in step S803 of FIG. 8.

FIG. 9 is a flowchart for describing restore processing of successive read data in step S803 of FIG. 8. In this processing, saved data, for which the restore processing 404 described in the management information is specified as "successive", is restored from the HDD 102 into the RAM 103.

First, in step S901, the variable ID is initialized to "1". In this case, the variable ID corresponds to the memory area identification data 401, and is used to specify, from management information, a memory area (an area in the RAM 103) to be restored. The process advances to step S902, in which it is determined whether management information in which the memory area identification data 401 coincides with the value of the variable ID is present among pieces of management information. If YES is determined in step S902, the process advances to step S903, in which the restore processing 404 of this management information is checked. If it is determined in step S903 that the restore processing 404 is "successive", the target restore processing is to be executed, so the process advances to step S904. In step S904, the start address of memory area 402, size of memory area 403, and save destination address 405 are read out from this management information. The process advances to step S905, in which based on the value read out in step S904, data of only the size of memory area 403 is read out from the save destination address 405 of the HDD 102, and data corresponding to the size of memory area 403 is rewritten from the start address of memory area 402 of the RAM 103. After ID-th data is read in this way, the process advances to step S906, in which the value of the variable ID is incremented by one to read out the next management information, and the process advances to step S902. If it is determined in step S902 that ID-th management information does not remain upon reading of the management information, the restore processing of successive read data ends.

By the processing shown in FIG. 9, saved data, which corresponds to the area size successively stored from the save destination address 405, is read out from the HDD 102, and is successively rewritten from the address of the RAM 103 indicated by the start address, thereby restoring data of the RAM 103.

FIG. 10 is a flowchart for describing restore processing of random read data in step S805 of FIG. 8. In this processing, among data for which the restore processing 404 described in the management information is specified as "random", data for which a restore request is issued and has a size equal to or smaller than the minimum memory management size is restored from the HDD 102 to the RAM 103. This is because restore processing is on-demand processing performed for each minimum memory size when an area for which a restore request is issued is accessed for the first time.

First, in step S1001, the address of an area for which a restore request is issued is stored in the variable AD. The process advances to step S1002, in which the start address of memory area 402 of each of the pieces of management information is sequentially checked to determine whether the address of the variable AD is included in it. If it is determined in step S1002 that the address of the variable AD and the start address of memory area 402 of one of the pieces of management information coincide with each other, the process advances to step S1003, in which the save destination address 405 is read out from this management information. The process advances to step S1004, in which saved data, which corresponds to the minimum memory management size, is read out from the HDD 102 using the save destination address 405 read out in step S1003, and data corresponding to the minimum memory management size is rewritten into the RAM 103 from the start address of memory area 402.

On the other hand, if it is determined in step S1002 that no corresponding start address of memory area 402 is present in any of the pieces of management information, no saved data is present, so the process advances to step S1005, in which abnormality processing is performed. This abnormality processing includes processing of outputting the address of the variable AD to a debug log.

As has been described above, according to this embodiment, an information processing apparatus can be quickly started up by performing hibernation processing specialized for the performance of a nonvolatile memory which saves data for hibernation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-032630, filed Feb. 17, 2011, which is hereby incorporated by reference herein in its entirety.

What is claimed is:

1. An information processing apparatus being able to access a volatile storage device, a first nonvolatile storage device having a higher access speed in a continuous access than a random access and a second nonvolatile storage device having a higher access speed in the random access than the continuous access, the apparatus comprising:
    a processor; and
    a memory storing a program that, when executed by the processor, performs the steps comprising:
    specifying one of either the first or second nonvolatile storage device in which data stored in the volatile storage device is to be saved;
    selecting a first storage method in which an amount of continuous data is larger than an amount of random data in a case that the specifying step specifies the first nonvolatile storage device, and selecting a second storage method in which an amount of random data is larger than an amount of continuous data in a case that the specifying step specifies the second nonvolatile storage device; and
    controlling to save the data stored in the volatile storage device in the nonvolatile storage device specified by the specifying step using the first or second storage method selected by the selection step in a case that a predetermined condition is satisfied, and stop supplying electric power to the volatile storage device.

2. The apparatus according to claim 1, further comprising measuring an access speed in the continuous access and an access speed in the random access of the first and second nonvolatile storage devices to be accessed by the information processing apparatus,
    wherein the specifying step specifies one of either the first or second nonvolatile storage device in which data stored in the volatile storage device is to be saved based on a measurement result by the measurement step.

3. The apparatus according to claim 1, wherein the data stored in the volatile storage device is saved as a hibernation image.

4. A method of controlling an information processing apparatus being able to access a volatile storage device, a first nonvolatile storage device having a higher access speed in a continuous access than a random access and a second nonvolatile storage device having a higher access speed in the random access than the continuous access, the method comprising:
    specifying one of either the first or second nonvolatile storage device in which data stored in the volatile storage device is to be saved;
    selecting a first storage method in which an amount of continuous data is larger than an amount of random data in a case that the specifying step specifies the first nonvolatile storage device, and selecting a second storage method in which an amount of random data is larger than an amount of continuous data in a case that the specifying step specifies the second nonvolatile storage device; and
    saving the data stored in the volatile storage device in the nonvolatile storage device specified in the specifying step using the first or second storage method selected in the selecting step in a case that a predetermined condition is satisfied, and stopping supplying electric power to the volatile storage device.

5. A non-transitory computer readable storage medium storing program for causing a computer to implement a method of controlling an information processing apparatus being able to access a volatile storage device, a first nonvolatile storage device having a higher access speed in a continuous access than a random access and a second nonvolatile storage device having a higher access speed in the random access than the continuous access, the method comprising:
    specifying one of either the first or second nonvolatile storage device in which data stored in the volatile storage device is to be saved;
    selecting a first storage method in which an amount of continuous data is larger than an amount of random data in a case that the specifying step specifies the first nonvolatile storage device, and selecting a second storage method in which an amount of random data is larger than an amount of continuous data in a case that the specifying step specifies the second nonvolatile storage device; and
    saving the data stored in the volatile storage device in the nonvolatile storage device specified in the specifying step using the first or second storage method selected in the selecting step in a case that a predetermined condition is satisfied, and stopping supplying electric power to the volatile storage device.

* * * * *